United States Patent [19]

Hirano

[11] Patent Number: 4,870,717
[45] Date of Patent: Oct. 3, 1989

[54] MEAT TENDERIZING DEVICE

[75] Inventor: Tsugutoshi Hirano, Narita, Japan

[73] Assignee: Kabushiki Kaisha Hirano Seisakusho, Japan

[21] Appl. No.: 186,249

[22] Filed: Apr. 26, 1988

[51] Int. Cl.$^4$ .............................................. A22C 9/00
[52] U.S. Cl. ......................................... 17/31; 17/30
[58] Field of Search ...................................... 17/30, 31

[56] References Cited

U.S. PATENT DOCUMENTS

| 961,019 | 6/1910 | Roberts . | |
|---|---|---|---|
| 3,661,072 | 5/1972 | Allinquant et al. | 99/256 |
| 4,112,544 | 9/1978 | d'Arras | 17/30 X |
| 4,199,841 | 4/1980 | Jaccard | 17/30 |
| 4,257,144 | 3/1981 | Takegoshi et al. | 17/30 |
| 4,463,476 | 8/1984 | Jaccard | 17/30 |

FOREIGN PATENT DOCUMENTS 58-28539 6/1983 Japan .
62-68581 4/1987 Japan .

*Primary Examiner*—Willis Little
*Attorney, Agent, or Firm*—Bruce L. Adams; Van C. Wilks

[57] ABSTRACT

A meat tenderizer for tenderizing a meat by cutting fibrous tissues and the like contained in the meat into pieces comprises a splitable body case and provided with an inner space, a case cover detachably attached to the body case so as to be opened in a rotatable manner, a cutting blade assembly comprising at least one cutter blade unit and holder plate integrally formed with the cutter blade unit, and a pressing member supported by the body case vertically slidable. The cutter blade unit has sticking cutter blades extending downwardly from the holder plate in a row and the pressing member is provided with the elongated plate abutting against the meat surface and having a slit through which the sticking cutter blades pass when the meat tenderizer is pressed downwardly. The cutting blade assembly is accommodated in the inner space of the body case and supported thereby without using any specific clamping member. The pressing member is always downwardly urged by the spring members accommodated in the body case. The body case and the case member are both splitable into halves having substantially the same configurations.

28 Claims, 9 Drawing Sheets

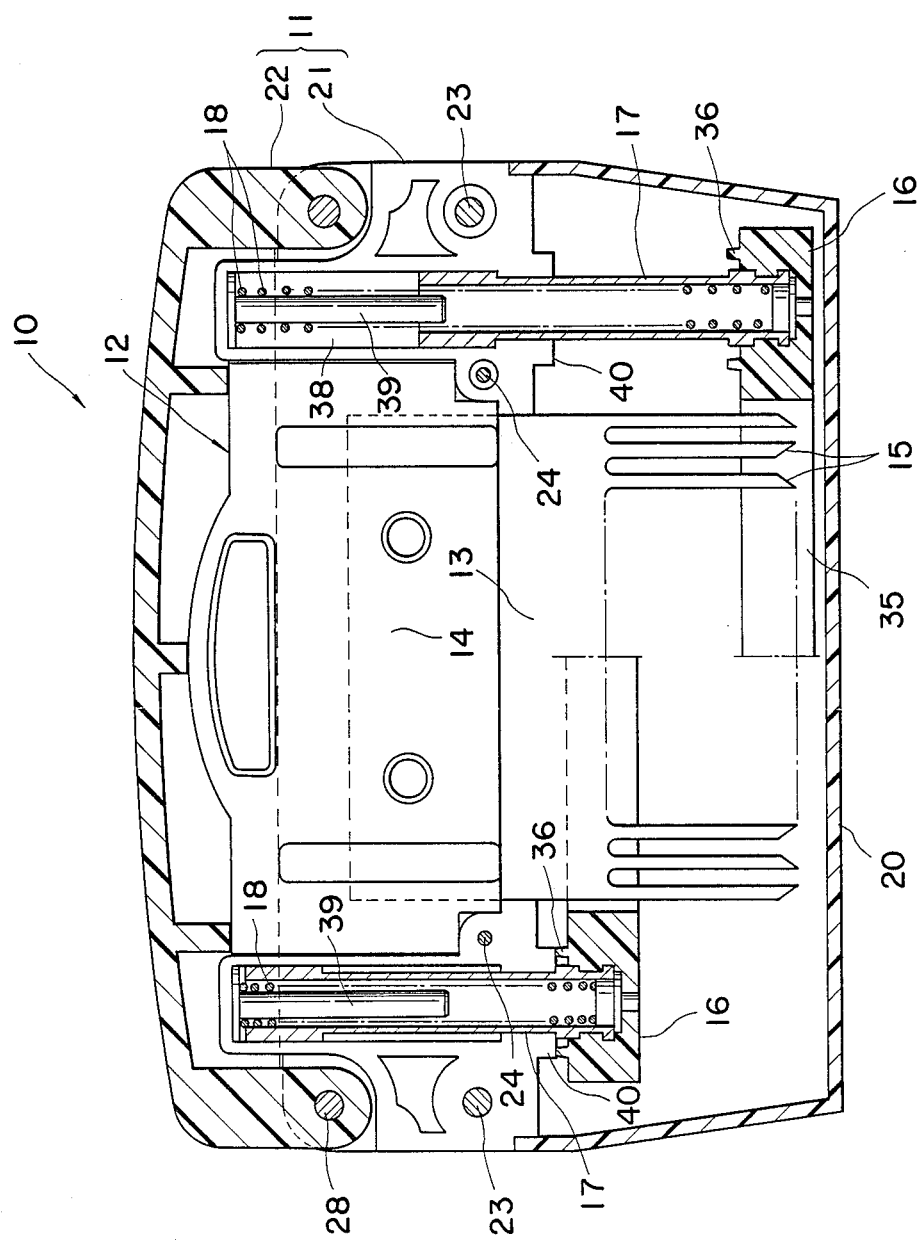
F I G. 1

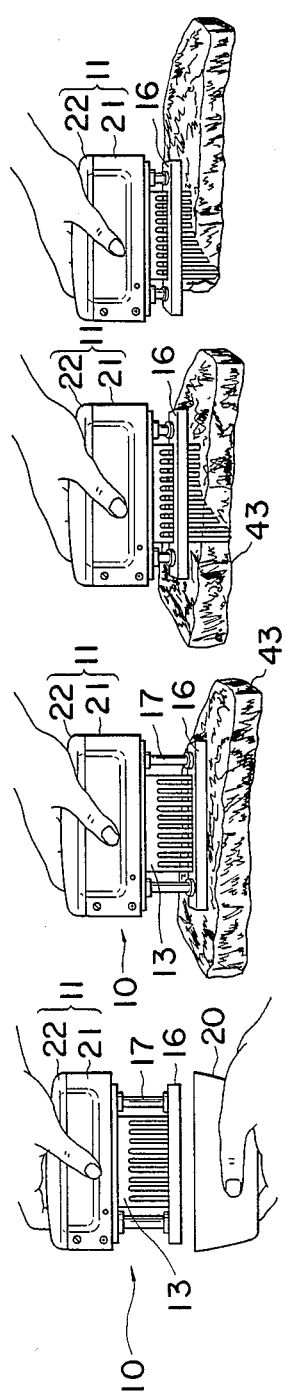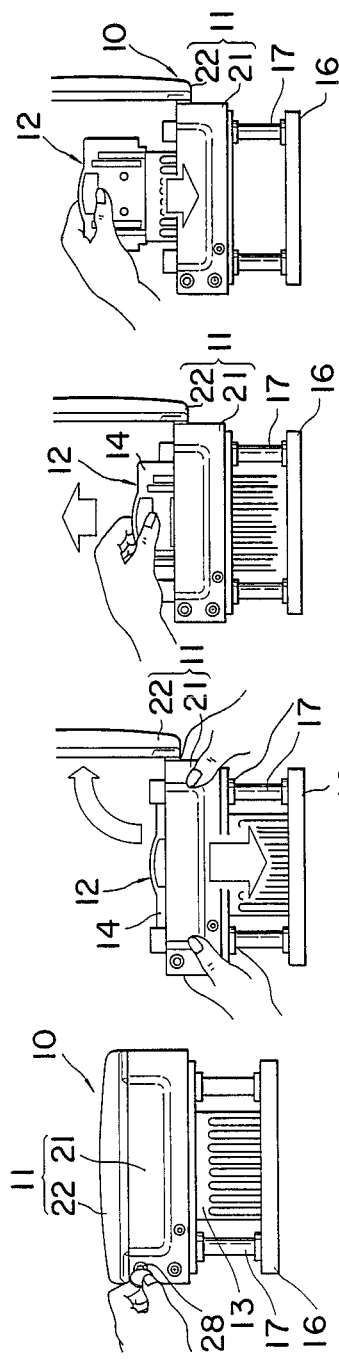

MEAT TENDERIZING DEVICE

BACKGROUND OF THE INVENTION

This invention relates to a device for tenderizing edible meat, and more particularly, to a handy-type meat tenderizer for tenderizing the edible meat by cutting muscles, tendons or fibrous tissues contained in the meat into short pieces.

The edible meat usually contains a number of muscles, tendons and fibrous tissues (hereinafter merely called straps) each having relatively long length and being harder than the other fleshy substance of the meat, and these fibrous tissues and straps are more liable to be shrunk than other fleshy substance of the meat in heat treatment, being not desired. These straps also prevent persons from comfortably eating the meat, and for this reason, it is required to preliminarily cut the straps with a specific cutter for effectively preventing the shrinkage of the meat when the meat is prepared or cooked and for comfortably eating the meat.

Such a specific cutter is usually called a meat tenderizer or tender, and the Japanese Utility Model Publication No. 28539/1983 discloses one example of a meat tenderizer of this type which has a construction shown in FIGS. 13 and 14 labeled as Prior Art.

Referring to FIGS. 13 and 14, the meat tenderizer comprises a splitable case member 100 (100a and 100b) acting also as a handle member, a cutter plate 101, a cutter plate holder 102 accommodated in the case 100 and supporting the cutter plate 101, a plurality of meat cutter blades 103 generally in shape of sharp sticking blades, suspended from the cutter plate 101, and a meat support plate 104 supported by vertical posts 107 to be vertically slidable, the support plate 105 being provided with a plurality of slits 104 through which the cutter blades 103 project downwardly.

According to the construction of the meat tenderizer of this prior art, the cutter plate 101 and the plate holder 102 are accommodated in the case 100 and firmly secured thereto by means of bolt, so that it is difficult to assemble the cutter plate 101 and the plate holder 102, after once disassembled for the purpose of cleaning, for example, in such a manner that the cutter blades 103 are inserted into the slits 105 of the support plate 104, and thus, the functioning of the reassembled cutter blade assembly may be adversely affected. In the actual cutting working, when the case 100 as the handle member is pressed manually downwardly, the pressing force is transmitted to the blade 103 supported by the cutter plate 101 in a concentrated manner through a clamping bolt 108 by which the case halves 100a and 100b are clamped with the plate holder 102 interposed there between, and accordingly, the concentrated load is applied to the cutter plate holder 102 from the handle member 100. It is therefore necessary to improve the mechanical strength of the handle 100 and the cutter plate holder 102 near the clamping bolt 108 against the concentrated load.

The case halves 100a and 100b have recesses which constitute bores when they are assembled as a case member 100, and spring members 106 are accommodated in the bores respectively. The upper ends of the posts 107 are fitted slidably into the bores in the manner urged downwardly by the spring members 106. When the handle 100 is pressed downwardly with the meat support plate abutting against the meat surface, the springs 106 are compressed. In fact, the springs 106 will be compressed to the maximum extent before the lower end of the case 100 reaches stopper portions 104a of the meat support plate 104. Accordingly, under this state, when the case 100 is further pressed downwardly, there is the possibility that the springs 106 will break the top portion of the case 100 and project outwardly, which will result in a fatal damage to the meat tenderizer itself.

SUMMARY OF THE INVENTION

Accordingly, a primary object of this invention is to substantially eliminate the defects or drawbacks of the conventional meat tenderizer of the type described above and to provide an improved handy type meat tenderizer capable of easily cutting tendons, muscles and fibrous tissues of an edible meat for tenderizing the same so as to be easily treated and cooked.

Another object of this invention is to provide a meat tenderizer having construction capable of making easy the disassembly or replacement of a cutter blade unit and the cleaning thereof with short time.

A further object of this invention is to provide a meat tenderizer having a cutter plate and a plate holder formed integrally as the cutter blade unit to be smoothly mounted in a case body for easily reassembling the meat tenderizer after once disassembled for the purpose of the cleaning, for example.

A still further object of this invention is to provide a meat tenderizer having construction in which spring members accommodated in the case body are prevented from projecting outwardly of the case body when the case body is forcibly pressed downwardly against the bias force of the springs.

A still further object of this invention is to provide a meat tenderizer having construction capable of distributing load applied to the cutter blade unit from the handle member for preventing the concentrated load and the accidental breaking of the meat tenderizer.

A still further object of this invention is to provide a meat tenderizer provided with constituting members or elements having common constructions to the respective splitable case halves, thus making enable the common utilization of molds to form the members or elements to economically save production cost.

These and other objects can be achieved according to this invention by providing a meat tenderizer for tenderizing a meat by cutting fibrous tissues and the like contained in the meat in pieces, comprising a body case splitable into a pair of case halves and provided with an inner hollow space when the case halves are coupled into the body case, a case cover detachably mounted to the body case, a cutting blade assembly comprising at least one cutter blade unit and holder plate integrally formed with the cutter blade unit having a plurality of sticking cutter blades aligned in a row, and a pressing member supported slidably by the body case through post members vertically standing from an elongated plate of the pressing member, the elongated plate has a slit through which the sticking cutter blades pass.

In the preferred embodiment, the post members are always downwardly urged by spring members located in cylindrical holes formed in the body case. The cutting blade assembly comprises a plurality of cutter blade units integrally formed and moldable with the holder plate, the cutting blade assembly being accommodated in the inner space of the body case and supported without using any clamping member. The case member also serves as a handle which is detachably attached to both bilateral ends of the case body by fastening members to be rotatable to open the same by loosening and removing one fastening member. The slit of the elongated plate of the pressing member has an upwardly tapered configuration for ensuring safe guidance and accommodation of the sticking cutter blades.

According to the construction of the preferred embodiment of the meat tenderizer of this invention, under the condition in that the pressing member is placed on the meat with the lower surface of the elongated plate abutting against the meat surface, when an operator grips the case member and presses downwardly, the cutting blade unit is lowered and the sticking cutter blades stick the meat through the slit of the elongated plate of the pressing member and thus cut the fibrous tissues and the like contained in the meat into pieces. The pressing load can be distributed to substantially entire portions of the body case without being concentrated to a specific point, thus maintaining the mechanical strength for long time use of the meat tenderizer.

BRIEF DESCRIPTION OF THE DRAWINGS

In the accompanying drawings:

FIG. 1 is a vertical sectional elevation of one preferred embodiment of a meat tenderizer according to this invention, in which left half represents a using state and right half represents a non-using state;

FIGS. 8A through 8D are continuous views illustrative of the use of the meat tenderizer according to this invention;

FIGS. 9A through 9D are continuous views illustrative of explanatory of the cutting blade changing operation;

DESCRIPTION OF THE PREFERRED EMBODIMENTS

Figure 2:
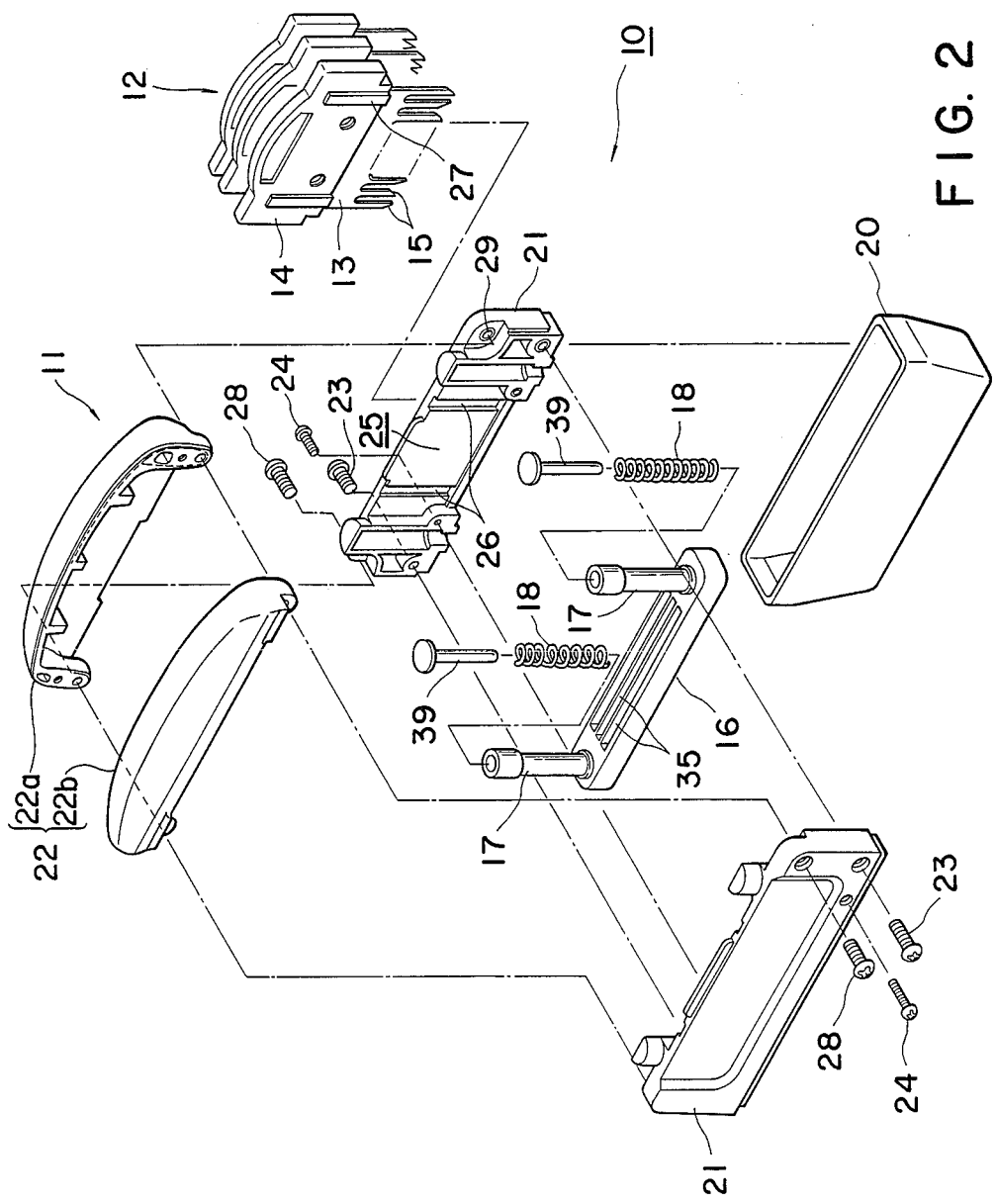
FIG. 2 is a developed perspective view of the meat tenderizer shown in FIG. 1.

FIGS. 1 and 2 represent a preferred embodiment of a handy type meat tenderizer according to this invention for cutting muscles, tendons and fibrous tissues (hereinafter collectively called straps) of an edible meat to tenderize the meat.

The meat tenderizer 10 comprises a main body case 11 also serving as a handle, molded and made of resin and at least one cutting blade unit 12, three in the illustrated embodiment, to be detachably accommodated in the case body 11, and the cutting blade unit 12 comprises a cutter plate 13 made of metal such as, preferably, steel, and a cutter plate holder 14 made of resin and combined with the cutter plate 13 in an inseparable manner. The cutter plate 13 comprises a plurality of parallel downwardly extending sticking cutter blades 15, each in needle shape, in a shape of teeth of a comb, which serves to finely cut the straps of the meat.

The sticking cutter blades 15 are aligned in a row and guided by a guide pusher 16, which is made of a resin material and provided with a lower surface for downwardly pressing and holding the meat. A pair of post members 17 made of metal vertically extends from both end portions of the upper surface of the guide pusher 16 in an integral manner, and the post members 17 are vertically slidably inserted into cylindrical holes, described hereinafter, of the body case 11. Spring members 18, usually coil springs, are accommodated in the holes to downwardly urge the post members 17.

In a time when the meat tenderizer is not used, a protector cover 20 is detachably fitted to the body case 11 from the side of the guide pusher 16 so that the protector cover 20 can accommodate therein the pusher 16 and the sticking cutter blades 15 of the respective blade units 12 to safely maintain the meat tenderizer.

The body case 11 formed by the molding method comprises a pair of splitable side case members 21 and a cover case member 22, which may be constructed by a pair of splitable two parts 22a and 22b as shown in FIG. 2, covering the tops of the side case members 21, respectively. The side case members 21 have the same shapes and thus molded by a common mold. The respective molded side case members 21 are coupled and combined with each other by means of clamping bolts 23 and 24, thus constituting the body case 11 with the inner space 25 defined thereby for accommodating the cutting blade units 12. In order to facilitate the mounting of the blade units in the case space 25, in the preferred illustrated embodiments, slide guide grooves 26 are formed in vertical fashion in the inside surfaces of the respective members 21, and protruded portions 27 formed on the outer surface of the plate holder 14 are slidably guided with the respective grooves 26 in engagement therewith.

Figure 3:
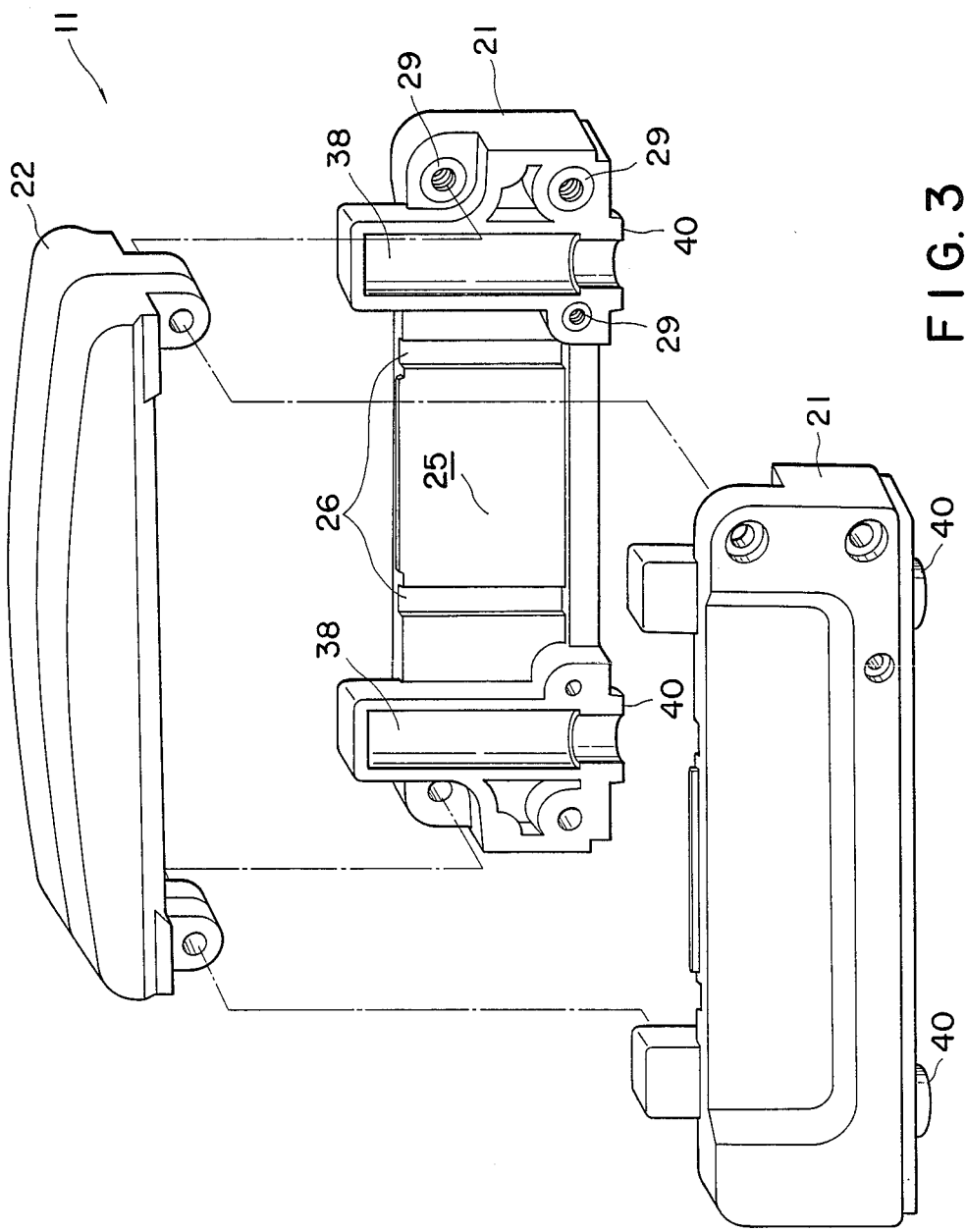
FIG. 3 is also a developed perspective view of a body case of the meat tenderizer shown in FIG. 1 or 2.

As briefly described hereinabove and shown in FIG. 3, the cover case member 22 is mounted so as to cover the coupled side case members 21 with the cutting blade units 12 incorporated therein, the cover case member 22 also serving as a handle for the meat tenderizer. The lateral end portions of the side case members 21 are provided with holes into which nuts 29 are inserted, and the cover case member 22 is secured to the side case members 21 in a hinged manner by means of clamping bolts 28 to be inserted into and engaged with the nuts 29, this structure reinforcing the physical and mechanical strength of the case member. The cover case member 22 is preferably integrally formed, but may be formed by a pair of splitable halves 22a and 22b which can be molded by a common mold.

Figure 4:
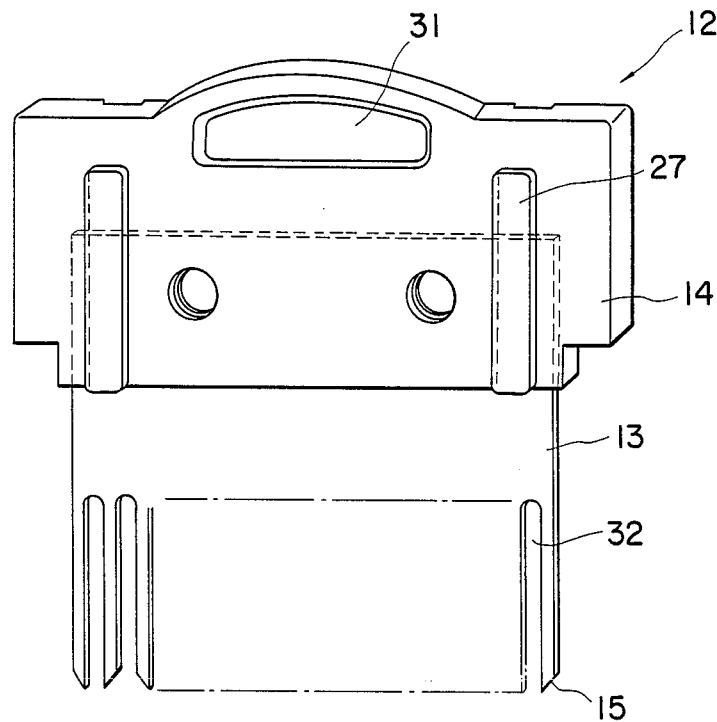
FIG. 4 is brief perspective view, partially broken, of a cutting blade unit to be accommodated in the body case shown in FIG. 3.
Figure 5:
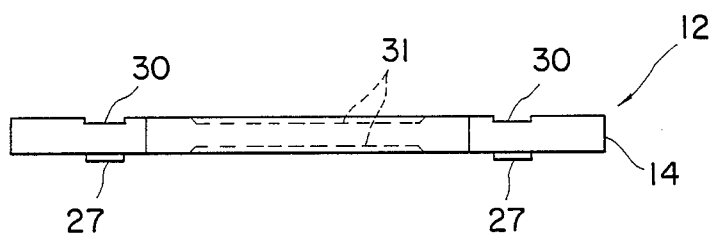
FIG. 5 is a top plan view of the cutting blade unit shown in FIG. 4.

Referring to FIGS. 4 and 5 showing a single unit 12 of the cutting blade to be accommodated in the inner space 25 of the body case 11, the base portion of the cutter plate 13 is molded as the plate holder 14. As shown in FIG. 5, a pair of the protruded portions 27 are formed on one side surface of the plate holder 14 and corresponding recessed portions 30 are formed in the other side surface thereof adjacent to another cutting blade unit to be engageable with the protruded portions of the adjacent another cutting blade unit 12 in a case where a plurality of cutting blade units are used in a combined manner. Recesses 31 are also formed in the upper portions of both side surfaces of the plate holder 14 for easily gripping or holding the same.

The cutter plate 13 of the cutting blade unit 12 is made of metal preferably, steel, and provided with the sticking cutter blades 15, each in needle shape, in comb shape extending downwardly. Cut portions 32 between the respective adjacent sticking blades 15 are ended at an intermediate portion of the cutter plate 13 each with a depth suitable for sticking and cutting the meat. The location of the cut portions 32 facilitating the flexibility of the sticking cutter blades 15. The cutter plate 13 and the plate holder 14 can be integrally molded, so that the intrusion of the meat juice into a space or gap between the cutter plate 13 and the plate holder 14 can be substantially perfectly prevented, thus being very sanitary.

Figure 6:
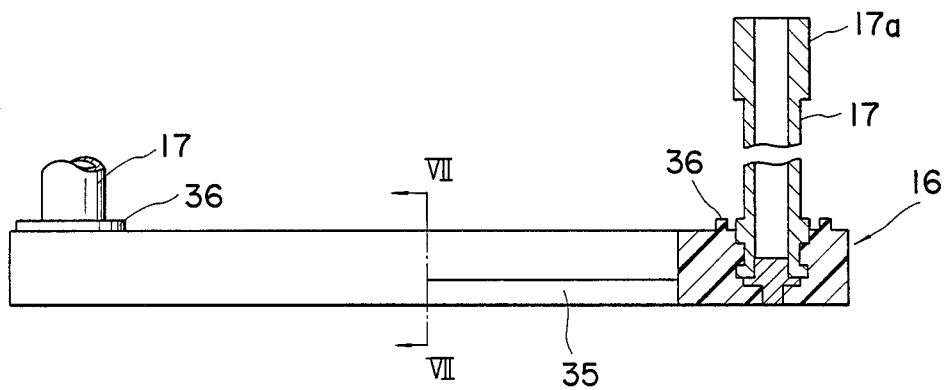
FIG. 6 is a front view, partially in section and partially broken away, of a pusher member of the meat tenderizer shown in FIG. 1.
Figure 7:
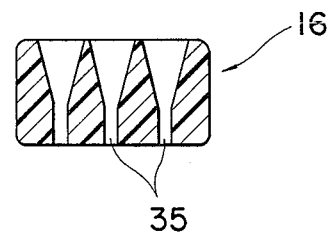
FIG. 7 is a cross sectional view taken along the line VII—VII shown in FIG. 6.

FIGS. 6 and 7 show the guide pusher 16 abutting against and holding the meat when the meat tenderizer of this invention is used. The guide pusher 16 is provided with at least one slit 35 extending in the longitudinal direction thereof, through which the sticking cutter blades 15 of the cutting unit 12 are guided, and the number and the location of the slits significantly corresponds to the number of the cutting units 12 to be used. The slit 35 may be formed in taper upwardly opened for facilitating the smooth insertion and guiding of the cutter plate 13, i.e. sticking cutter blades 15 in assembling the meat tenderizer. The vertical length of the cutter plate 13 is so determined in the preferred embodiment that the front sticking blade end is positioned in the slit 35 when the meat tenderizer is not used.

A pair of the cylindrical guide posts 17 made of metal are secured to both the lateral ends of the guide pusher 16 in the vertically standing manner. Annular stoppers 36 are formed on the upper surface of the guide pusher 16 around the cylindrical guide posts 17. Each of the guide post 17 is of a hollow pipe and the upper portion 17a thereof is formed as a sliding portion also serving as a piston member. The sliding portions 17a can be slidably accommodated in the hollow cylindrical portions 38 formed by the case members 21 of the body case 11 as shown in FIGS. 1 and 2 and in FIG. 3, and are downwardly urged by the coil springs 18 accommodated in the hollow cylinder portions 38. The coil springs 18 are compressed along guide pins 39 also accommodated in the cylindrical portions 38. Annular portions 40 (FIGS. 1 and 3) are also formed on the lower surface of the body case 11 in a protruded manner at positions corresponding to the locations of the annular stoppers 36 in such a manner that the annular portions 40 abut against the corresponding annular stoppers 36 when the body case 11 is lowered by the maximum stroke. According to the construction of the preferred embodiment, however, the springs 18 are accommodated in the hollow cylindrical portions 38 so as to retain their urging forces even in a case where the body case 11 is maximally lowered, thereby preventing the compressed springs 18 from accidentally braking the body case 11 when maximally lowered and maintaining the functions of the meat tenderizer.

The actual usage of the meat tenderizer of this invention will be explained hereunder with reference to FIG. 8.

The protector cover 20 is first dismounted from the body case 11 (FIG. 8A) to allow the prompt use of the meat tenderizer 10. An operator grips the cover case member 22 as a handle and the case members 21 and places the tenderizer 10 on the meat 43 in such a manner that the guide pusher 16 abuts against the meat surface (FIG. 8B). The operator then downwardly presses the body case 11 (FIG. 8C) so that the cutter blades 15 sharply insert into the meat, stick and cut the fibrous tissues, tendons, hard muscles and the like of the meat 43 In this pressing step, the load applied to the cover case member 22 is transmitted to the cutting blade units 12 through the entire surface contact to the top portion of the blade units 12 without being concentrated on some point or portion thereof. In the next step, when the pressing force is loosened or released, the body case 11 is moved upwardly by the urging force of the springs 18 and the sticking cutter blades 15 are drawn out from the meat 43. These operations shown in FIGS. 8B and 8C are repeated by changing portions of the meat 43 on which the guide pusher 16 of the meat tenderizer 10 is placed (FIG. 8D), whereby the fibrous tissues and the like contained in the meat 43 can be effectively cut and tenderized, and in the heat treatment such as in the cooking of the meat, the fibrous tissues and the like are hardly shrunk and the meat is made comfortable to be edible.

The cleaning or changing working of the cutting blade unit 12 will be explained hereunder with reference to FIG. 9.

During the sticking and tenderizing operations, the meat juice adheres to the cutting blade units 12 and the associated members, so that cleaning thereof is required after the sticking and cutting operation for the purpose of, for example, preventing the breeding of various germs caused by the meat juice.

The clamping bolt or screw 28 on one side of the body case 11 is first loosened by means of such as a coin as shown (FIG. 9A) to disassemble the cover member 22 from the case member 21. The cover member 22 is opened upwardly by pivoting the same about the other side of the case body 11, and the body case 11 is then lowered by holding both the sides thereof with hands (FIG. 9B) to project the upper portion of the cutter plate holder 14 over the upper portion of the lowered body case 11 from the accommodating space 25 therein. The cutting blade unit 12 is upwardly drawn out from the case body 11 (FIG. 9C). The thus drawn-out cutting blade unit 12 and the body case 11 are well cleaned by a neutral detergent. The cleaning can be effectively and sanitarily performed for the reason that the cutter plate 13 and the plate holder 14 are integrally molded.

After the cleaning, the cutting blade unit 12 is inserted into the space 25 of the body case 11 from the upper side thereof and placed in operating position (FIG. 9D). The cover member 22 is thereafter rotated to cover the upper portion of the body case 11 and the clamping screw 28 is screwed to fasten the cover member 22 to the body case 11. In the assembling thereof, since the protruding portions 27 formed on the surface of the cutting blade unit 12 are engaged with the slide guide grooves 26 of the body case 11, the insertion of the cutting blade unit 12 can be smoothly and exactly performed. Because of the tapered surface of the slit 35 of the guide pusher 16, the safe and easy insertion of the cutter blade unit 12 can be facilitated.

Substantially the same disassembling and reassembling processes can be carried out in a case where the cutting quality of the blade is degraded or the blade is accidentally bent.

After the completion of these steps, the case cover 20 is mounted to the case body 11 and the meat tenderizer can be safely maintained.

Figure 10:
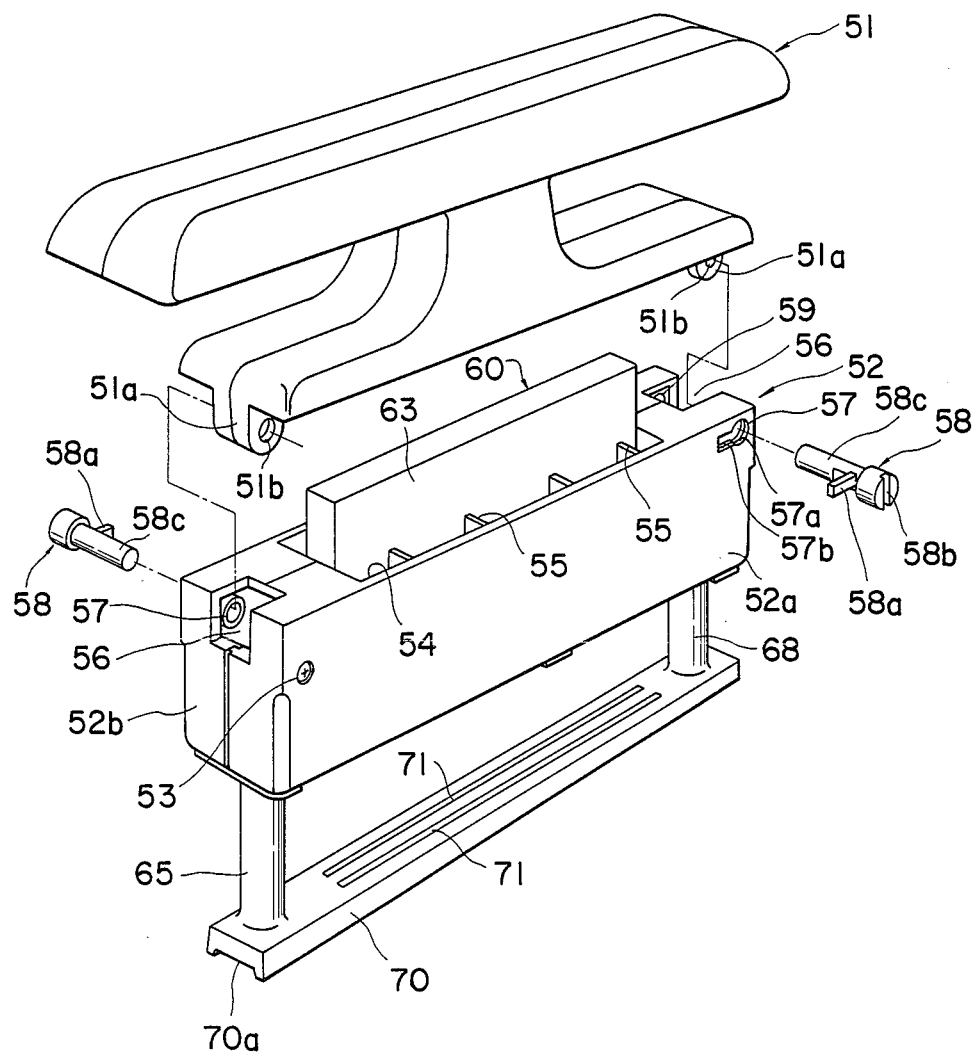
FIG. 10 is a perspective view of another preferred embodiment of a meat tenderizer according to this invention.
Figure 11:
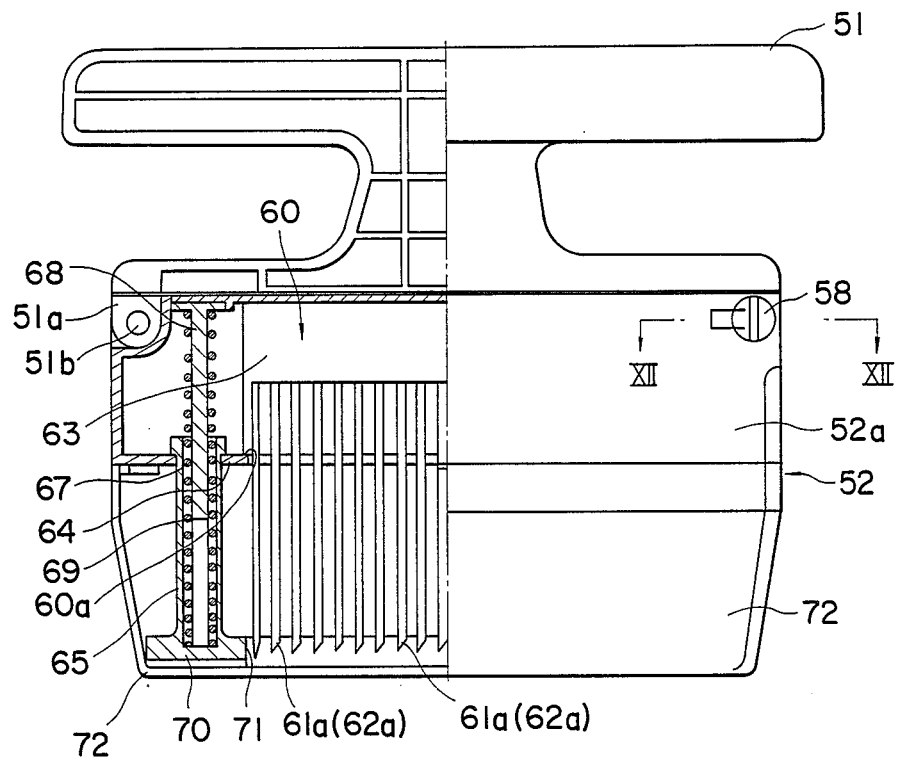
FIG. 11 is a front view, left half in vertical section of the meat tenderizer with a protector cover shown in FIG. 10.
Figure 12:
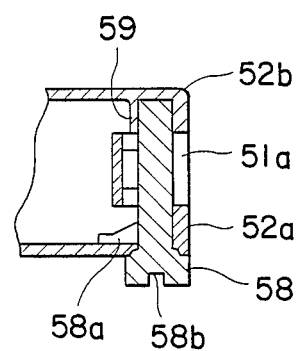
FIG. 12 is a sectional view taken along the line XII—XII shown in FIG. 11.
Figure 13:
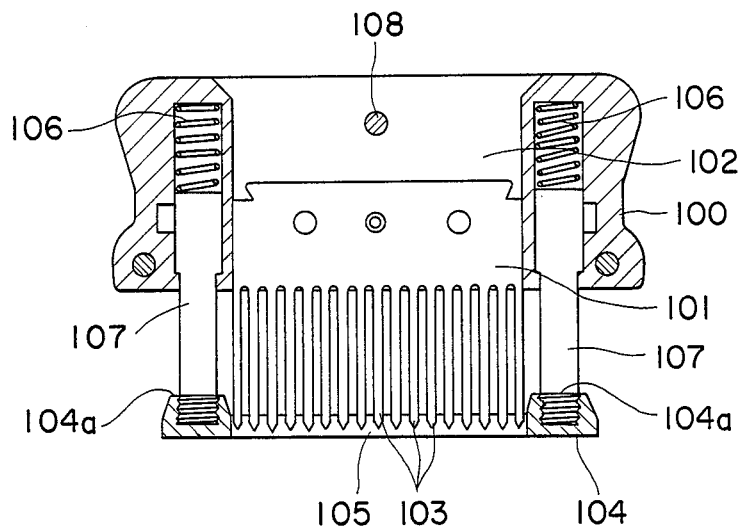
FIG. 13 is a vertical sectional elevation of one example of a meat tenderizer of prior art.
Figure 14:
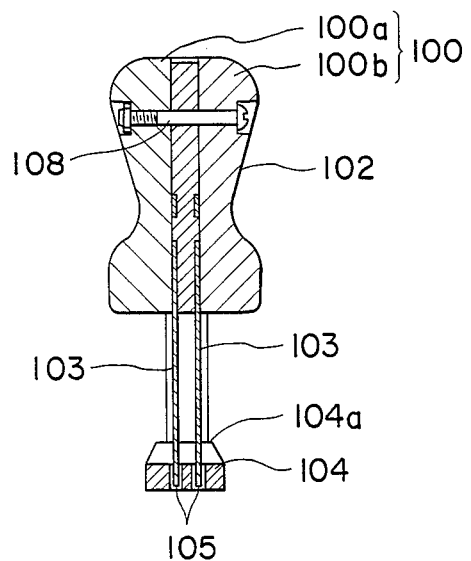
FIG. 14 is a vertical sectional side view of the meat tenderizer shown in FIG. 13.

FIGS. 10 to 12 show another embodiment of a meat tenderizer according to this invention, and the illustrated embodiment has some changes or modifications from that referred to with reference to the embodiment shown in FIGS. 1 to 9. The most significant difference resides in the structure of the cutter blade unit, and a cutter blade plate shown FIGS. 10 to 12 has a plurality of sticking cutter blade units which are integrally formed, whereas in the aforementioned embodiment, the cutting blade units are detachably assembled.

Referring to FIGS. 10 to 12, reference numeral 51 denotes a handle member also serving as a cover member for a body case 52, and the handle member 51 is made of a synthetic resin to be splitable into vertical halves, which are molded by a common mold. The handle member 51 may of course be molded as one integral member. Projecting portions 51a are formed on the lower surface of the handle member 51 and provided with through holes 51b, respectively. The body case 52 comprises a pair of splitable case halves 52a and 52b which have substantially the same shape and are coupled together by means of, for example, fastening screws 53. The body case 52 in the coupled state defines an inner hollow space 54 in which a cutting blade unit 60, described in detail hereinafter, is detachably accommodated, and the hollow space 54 is opened at both vertical ends. A plurality of ribs 55 is attached to the inner surfaces of the case halves 52a and 52b to project inwardly of the space 4, these ribs 55 serving as reinforcing members for the body case as well as positioning members for the cutting blade unit 60 to be inserted therein. The case halves 52a and 52b have cut-away portions 56 at both upper ends thereof and when the case halves are coupled together, the cut-away portions 56 comprise recessed hollow portions into which the projecting portions 51a are inserted. At each end of the respective case halves 52a and 52b are formed fastening holes 57 in correspondence to the cut-away portions 56, each fastening hole 57 having a round portion 57a and a square portion 57b. At the other end of each of the respective case halves 52a and 52b are formed in a projected manner engaging holes 59 opposing the fastening holes 57, respectively. Reference numeral 58 denotes an engaging pin which is engaged with the hole 57, and the pin 58 comprises a head with a slit 58b (FIG. 12), an axial extension 58c and a projection 58a extending normally to the axial extension. The projection 58a has a square shape to be fitted into the square portion 57b of the fastening hole 57.

In assembling the handle member 51, the projecting portions 51a are fitted into the cut-away portions 56, respectively, of the body case 52 in the coupled state and the engaging pins 58 are then inserted into the fastening holes 57, respectively, and engaged with the corresponding engaging holes 59 through the holes 51b of the projecting portions 51a. After the insertion of the engaging pin 58, as shown in FIG. 12, counterclockwise rotation of the engaging pin 58 ensures firm fastening of the handle member 51 to the body case 52 in engagement of the square extension 58a of the pin 58 with the inner surface of the case half 52a (52b). As can be understood from these constructions, the handle member 51 can be attached to the body case 52 to be openable in a pivotable manner about one of the engaging pins 58 as hinge means.

A cutting blade assembly 60 comprises a blade holder plate 63 and at least one row of blade members 61(62) (two rows of blade members 61 and 62 are shown in the illustrated embodiment). Each row of blade member 61(62) has a comb teeth shape having plurality of sticking cutter blades 61a (62a), each in needle shape, extending downwardly from the holder plate 63. The holder plate 63 is preferably made of a synthetic resin and can be molded together with the blade members 61 and 62. The usage of the plurality of blade members more than two may be of course a matter of design as occasion demands.

The cutting blade assembly 60 has bilateral lower ends formed as stepped portions serving as stopper member 60a, which are engaged with projections 64 extending from the inner surfaces of the respective case halves 52a and 52b to prevent the cutting blade assembly 60 from downwardly dropping out. The cutting blade assembly 60 is also positioned at the upper portion by the bottom surface of the handle member 51 serving as case cover and at the side portions by the ribs 55.

A guide pusher 70 is of substantially the same structure as that of the afore-mentioned embodiment, and hollow post members 65 and 66 are located at both longitudinal ends of the guide pusher 70 in a vertically extending fashion. The post members 65 and 66 are slidably fitted into the body case 52 through holes 67 provided at the lower end thereof, and in an assembled state, the upper end, formed as a staged portion, of the post member 65(66) is engaged with the portion near the hole 67 to prevent the post member from downwardly dropping out. Guide rods 68 are attached to the upper portion of the body case 52 to extend downwardly, and the lower portion of each guide rod 68 extends into the hollow portion of the post member 65, as shown in FIG. 11. Coil springs 69 are interposed between the inner walls of the post members 65 and 66 and the guide rods 68 so as to always downwardly bias the post members, i.e., the guide pusher 70. The post members 65 may be formed integrally with the pusher member 72 or detachably therefrom. The guide pusher 70 is provided with longitudinal slits 71, the number of which is determined by the number of the rows of the sticking cutter blades. The cutter blade assembly 60 is so positioned in the assembled conditions that the front sharp ends of the respective blades 61a and 62a are positioned in the corresponding slits 71 in rows. The lower surface, abutting against the meat surface, of the guide pusher 70 has a trapezoid shape to hold the meat and fascilitate the stability of the pusher member 70 when used. Of course, substantially the circular shape, inverted V-shape or the like shape may be selected When the meat tenderizer is not used, a protector cover 72 is mounted from the lower portion thereof as shown in FIG. 11.

When it is required to clean or change the cutting blade assembly 60, one of the fastening pins 58 is loosened and disengaged from the engaging hole 59, and the handle member 51 is upwardly pulled. The handle member 51 is pivotably rotated about the other fastening pin 58 to open the same. Under this condition, the cutting blade assembly 60 is easily taken out by pulling it upwardly. New or cleaned cutting blade assembly can be easily mounted in the space of the body case 51 in the manner reverse to that described hereinabove.

The sticking and cutting operation for cutting the fibrous tissues, straps and the like portions of the meat is performed by manually downwardly pressing the handle member 51 in accordance with substantially the same manner as that described hereinbefore with respect to the former embodiment.

According to the preferred embodiments of the meat tenderizer of this invention, many parts or members such as case halves, case cover halves, and fastening members are formed by using respectively the same mold, thus saving the manufacturing cost and facilitating easy assembling or disassembling the tenderizer. In addition, the changing of the cutting blade unit or assembly can be easily done manually. The integral formation of the blade holder and the sticking cutter blade makes easy the sanitary washing or cleaning of these members. Moreover, the pressing load applied to the case cover member or handle member is distributed substantially evenly without concentrated to a specific point, thus obviating the accidental breaking of the tenderizer due to the concentrated load.

It will be understood that this invention is described hereinbefore with reference to the preferred embodiments, but various other changes or modifications thereof may be made without departing from the scope or spirit of the appended claims. For example, the gripping portion of the case cover 14 of the first embodiment and the handle member 51 of the second embodiment may be constructed in shapes other than the illustrations, and the fastening means for combining the case member and the body case can be constructed by any other means for example by forming dovetail grooves into the case body to be engageable with an engaging portion formed on the body case.

What is claimed is:

1. A meat tenderizer for tenderizing meat by cutting fibrous tissues and the like contained in the meat in pieces, comprising:
   a body case comprised of a pair case halves defining an inner hollow space when the case halves are assembled into the body case;
   a body case cover enclosing said inner space and detachably mounted on said body case to permit access to said inner space, said case cover serving as handle means;
   a cutting blade assembly releasably retained within said inner space of the body case, said cutting blade assembly comprising at least one cutter blade means having a plurality of substantially parallel cutter blades aligned in a row and a holder plate integrally formed with the cutter blade means in such a manner that the cutter blades extend downwardly from the holder plate during use of the tenderizer and
   pressing means slidably supported by said body case, said pressing means comprising an elongated plate having a lower surface for abutting against the meat to be treated and provided with at least one slit through which said cutter blades extend and comprising post members extending vertically from lateral end portions of an upper surface of the elongated plate, said post members being slidably engaged within said body case in a downwardly biased manner.

2. The meat tenderizer according to claim 1 wherein said post members are formed integrally with said elongated plate.

3. The meat tenderizer according to claim 1 wherein said post members are formed to be detachable from said elongated plate.

4. The meat tenderizer according to claim 1 wherein said case halves have substantially the same configuration and are provided with respective pairs of grooves each being semi-circular in cross section and located at bilateral end portions thereof in such a manner that when said case halves are coupled as the body case, corresponding semicircular grooves of said case halves constitute vertical cylindrical blind bores into which said post members are to be inserted and wherein spring means are accommodated in said blind bores for downwardly biasing said post members.

5. The meat tenderizer according to claim 4 wherein said post members are formed as cylindrical members provided with inner hollow portions and said spring means comprise coil springs accommodated in said hollow portions respectively as well as in said blind bores for always downwardly biasing the post members.

6. The meat tenderizer according to claim 5 wherein a guide pin is accommodated in each of said cylindrical blind bores, each of said guide pins having a head portion to abut against the bottom of the blind bore and having a leg portion which downwardly extends from the head portion and along which said coil springs are compressible.

7. The meat tenderizer according to claim 4 wherein said elongated plate of the pressing means is provided with stopper members formed integrally with the elongated plate around said post members in protruded manner, said stopper members abutting against a lower surface of the body case when the body case is pressed downwardly before said spring means have been maximally compressed.

8. The meat tenderizer according to claim 7 wherein round protruded portions are formed on the lower surface of the body case to abut against the corresponding stopper members of the elongated plate when the meat tenderizer is downwardly pressed.

9. The meat tenderizer according to claim 1 wherein said cutting blade assembly comprises one cutter blade means provided with single row of said cutter blades and one holder plate integrally molded with the cutter blade means.

10. The meat tenderizer according to claim 1 wherein said cutting blade assembly comprises a plurality of cutter blade means and holder plates which are releasably assembled together and accommodated within the body case.

11. The meat tenderizer according to claim 10 wherein each of said holder plates has one surface on which a pair of protruded portions are formed and another surface on which a pair of recesses are formed, said protruded portions of one holder plate being engaged with said recesses of an adjacent holder plate when said holder plates are combined, at least one case half of the body case having an inner surface provided with recesses which are engageable with the protruded portions of the outermost one of the combined holder plates.

12. The meat tenderizer according to claim 1 wherein said holder plate has stepped portions at bilateral ends thereof and said body case has extensions at bilateral lower ends thereof which are engageable with said stepped portions when said cutting blade assembly is accommodated in said inner space in said body case.

13. The meat tenderizing according to claim 1 wherein said cutting blade assembly comprises a plurality of cutter blade means and one holder plate with which the cutter blade means are integrally molded.

14. The meat tenderizer according to claim 13 wherein each of said case halves has rib members projecting inwardly from an inner surface thereof towards said inner space, said ribs supporting the cutting blade assembly when accommodated in said inner space.

15. The meat tenderizer according to claim 1 wherein said cutter blades have front sharp sticking ends arranged in a row which are positioned in the slit when the meat tenderizer is not used.

16. The meat tenderizer according to claim 1 wherein said case cover is splitable into two longitudinal case halves having substantially the same configuration.

17. The meat tenderizer according to claim 1 wherein said case cover is provided with a grip portion to be manually gripped and pressed downwardly.

18. The meat tenderizer according to claim 1 wherein the elongated plate of said pressing means is provided with a plurality of slits the number of which corresponds to the number of cutter blade means passing therethrough.

19. The meat tenderizer according to claim 18 wherein each of said slits has inner surfaces tapered upwardly.

20. The meat tenderizer according to claim 1 wherein said case cover is detachably secured to said body case by fastening means at both bilateral upper ends thereof.

21. The meat tenderizer according to claim 20 wherein said fastening means comprise bolt means and wherein said case cover is opened upwardly in a manner rotatable around one bolt means when the other bolt means is disengaged from said body case and said case cover pulled upwardly.

22. The meat tenderizer according to claim 20 wherein each of said bolt means comprises a head, a leg portion extending from the head, and a square member extending normally to the axial direction of the leg portion and wherein each of said case halves is provided with an engaging hole into which said bolt means is inserted, said engaging hole has a circular portion and a square portion corresponding to outer configurations of said bolt means.

23. The meat tenderizer according to claim 20 wherein said bolt means is rotatable after inserted into the corresponding engaging hole of the case half for firm engagement therewith.

24. A device for tenderizing meat, comprising: a hollow open ended body case; a detachable lid covering one open end of said body case; a cutter blade cassette having a plurality of cutter blades and being slidably insertable into said body case through said one open end so that the cutter blades protrude outwardly from the other open end; said cutter blade cassette being retained within said body case by said lid and consisting of a unitary structure comprising a holder portion from which the cutter blades depend for cutting fibrous tissues contained in meat.

25. The device of claim 24 in which said hollow body case contains a plurality of said cutter blade cassettes situated side-by-side, each of said cassettes being slidably removable from said body case upon detachment of said lid from said body case.

26. The device of claim 24 in which said lid is pivotally mounted on said body case alternately to cover and uncover the interior thereof.

27. A cutter blade cassette for use in meat tenderizers, comprising a compact encasement in which a plurality of outwardly projecting cutter blades are embedded at one end to form a unitary whole.

28. The cassette of claim 27 in which said encasement is provided with tactile means by which it may be gripped.

* * * * *